United States Patent
Cobb

(10) Patent No.: US 10,591,732 B2
(45) Date of Patent: Mar. 17, 2020

(54) MONOCENTRIC WIDE FIELD PERSONAL DISPLAY

(71) Applicant: Corning Incorporated, Corning, NY (US)

(72) Inventor: Joshua Monroe Cobb, Victor, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/794,822

(22) Filed: Oct. 26, 2017

(65) Prior Publication Data

US 2018/0120567 A1     May 3, 2018

Related U.S. Application Data

(60) Provisional application No. 62/415,059, filed on Oct. 31, 2016.

(51) Int. Cl.
*G02B 27/01*     (2006.01)
*G02B 27/28*     (2006.01)
(Continued)

(52) U.S. Cl.
CPC ..... *G02B 27/0172* (2013.01); *G02B 27/0176* (2013.01); *G02B 27/283* (2013.01);
(Continued)

(58) Field of Classification Search
CPC ........ G02B 27/01; G02B 27/28; G02B 27/26; G02B 27/00; G02B 1/04; G02B 1/11; G02B 2027/01
See application file for complete search history.

(56) References Cited

U.S. PATENT DOCUMENTS

| 4,234,891 A | 11/1980 | Beck et al. |
| 2003/0184868 A1* | 10/2003 | Geist ................. G02B 27/0172 359/630 |

(Continued)

FOREIGN PATENT DOCUMENTS

| CN | 105589201 A | * | 5/2016 |
| CN | 105589201 A | * | 5/2016 |

(Continued)

OTHER PUBLICATIONS

International Search Report and Written Opinion of the International Searching Authority; PCT/US2017/058507; dated Mar. 23, 2018; 19 pages; European Patent Office.

(Continued)

*Primary Examiner* — Cara E Rakowski
*Assistant Examiner* — Danell L Owens
(74) *Attorney, Agent, or Firm* — Smit Kapadia; Svetlana Z. Short

(57) ABSTRACT

A display apparatus comprising at least one image generator having a curved display surface that generates image-bearing light, the display surface having at least one radius of curvature $r1_d$; a reflective component spaced apart from the image generator, the reflective component having an incident reflective surface concave to the image and at least one radius of curvature $r1_r$, disposed to create a virtual image of the curved display surface; and a beam splitter plate disposed in free space between the image generator and the reflective component and having first and second surfaces that are oblique to a line of sight of a viewer, wherein the reflective component and the beam splitter plate define a viewer eye box for the image-bearing light along the line of sight of the viewer, wherein the curved display surface and the reflective surface are substantially concentric.

38 Claims, 12 Drawing Sheets

(51) Int. Cl.
*G02B 1/04* (2006.01)
*G02B 1/11* (2015.01)

(52) U.S. Cl.
CPC ............... *G02B 1/04* (2013.01); *G02B 1/11* (2013.01); *G02B 2027/011* (2013.01); *G02B 2027/0123* (2013.01); *G02B 2027/0132* (2013.01); *G02B 2027/0145* (2013.01); *G02B 2027/0152* (2013.01)

(56) References Cited

U.S. PATENT DOCUMENTS

| | | | | |
|---|---|---|---|---|
| 2007/0285791 | A1* | 12/2007 | Vrachan | G02B 5/10 359/618 |
| 2012/0127487 | A1* | 5/2012 | Potapenko | G01B 11/0691 356/632 |
| 2012/0242697 | A1* | 9/2012 | Border | G02B 27/0093 345/633 |
| 2014/0259321 | A1* | 9/2014 | Arnold | A42B 3/226 2/424 |
| 2015/0188997 | A1* | 7/2015 | Park | G06F 1/163 709/201 |
| 2016/0041390 | A1* | 2/2016 | Poon | G02B 3/04 345/8 |
| 2016/0077336 | A1* | 3/2016 | Hainich | G02B 27/017 345/8 |
| 2016/0116735 | A1* | 4/2016 | Hayashi | G02B 27/0101 345/7 |
| 2017/0097511 | A1* | 4/2017 | Xu | G02B 27/2221 |

FOREIGN PATENT DOCUMENTS

| | | | | |
|---|---|---|---|---|
| DE | 102009047471 A1 * | 6/2011 | | G02B 27/283 |
| FR | 2992071 A1 | 12/2013 | | |
| GB | 1282425 A | 7/1972 | | |

OTHER PUBLICATIONS

Invitation to Pay Additional Fees of the International Searching Authority; PCT/US2017/058507; dated Jan. 31, 2018; 13 pages.

* cited by examiner

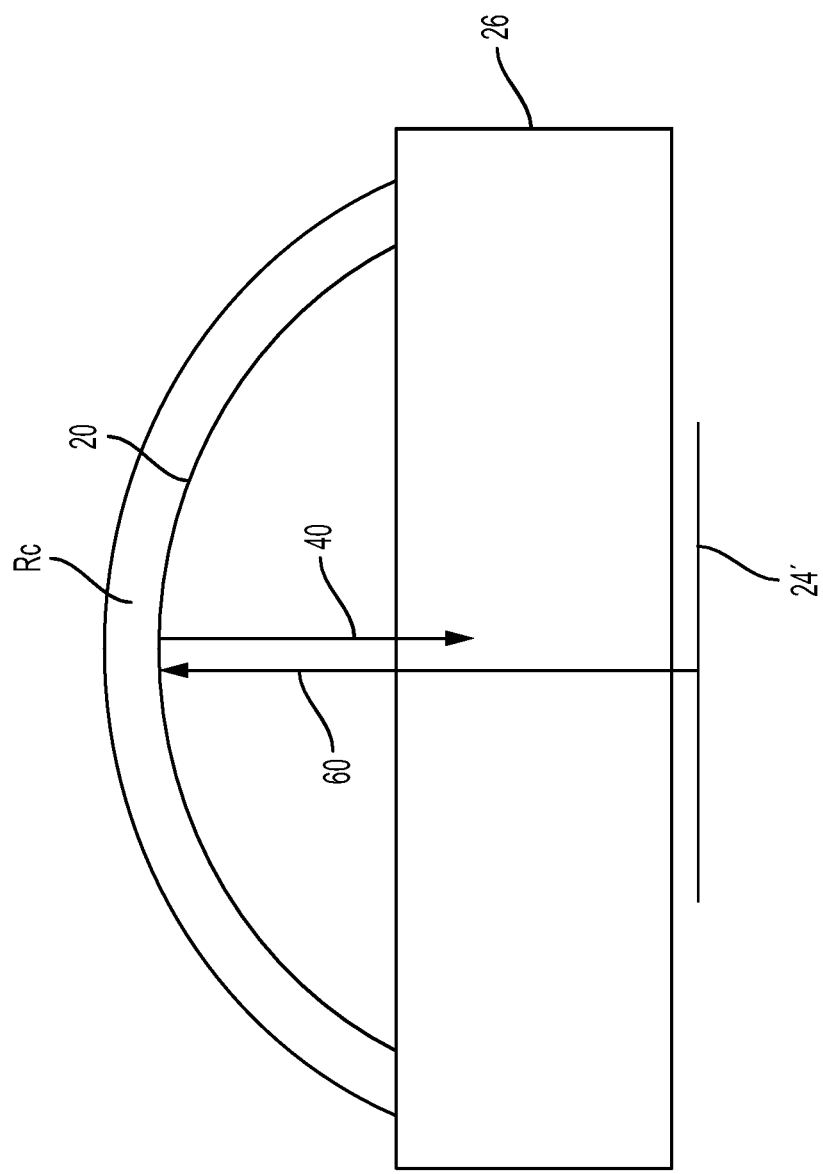

MONOCENTRIC WIDE FIELD PERSONAL DISPLAY

This application claims the benefit of priority under 35 U.S.C. § 119 of U.S. Provisional Application Ser. No. 62/415,059, filed on Oct. 31, 2016, the content of which is relied upon and incorporated herein by reference in its entirety.

FIELD OF THE INVENTION

The disclosure relates generally to personal display devices and more particularly to apparatus and methods for a wide-field head-mounted or other single-viewer display having a pupil imaging system.

BACKGROUND

Personal display devices make it possible to provide image content to a viewer in applications where the use of conventional display screens would be an encumbrance. Head-mounted devices (HMDs), such as display goggles, are being considered as a useful type of wearable personal display device usable in a variety of fields, with applications ranging from military, medical, dental, industrial, and game presentation, among others. Stereoscopic imaging, with its enhanced spatial representation and improved presentation of relevant detail, can be particularly useful for presenting images that are more lifelike and that show depth information more accurately than can be possible with 2-dimensional (2-D) flat displays.

Although a number of advances have been made for improving usability, size, cost, and performance of wearable display devices, there remains considerable room for improvement. In particular, imaging optics that present the electronically processed images to the viewer have been disappointing. Conventional design approaches have proved difficult to scale to the demanding size, weight, and placement requirements, often poorly addressing optical problems related to field of view and distortion, eye relief, pupil size, and other factors.

SUMMARY OF THE INVENTION

According to an aspect of the present disclosure, there is provided a display apparatus comprising:
at least one image generator having a curved display surface that generates image-bearing light, the display surface having at least one radius of curvature $r1_d$;
a reflective component spaced apart from the image generator, the reflective component having an incident reflective surface concave to the image and at least one radius of curvature $r1_r$, disposed to create a virtual image of said curved display surface; and
a beam splitter plate disposed in free space between the image generator and the reflective component and having first and second surfaces that are oblique to a line of sight of a viewer, wherein the reflective component and the beam splitter plate define a viewer eye box for the image-bearing light along the line of sight of the viewer, wherein the curved display surface and the reflective surface are substantially concentric.

The display apparatus designs described herein result in increased field of view, reduced image aberration, and large pupil size at low cost compared to other designs, thereby providing personal display device designs that are readily manufacturable and inherently adapted to the human visual system. Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 3 is a side view of the device shown in FIG. 2.

DETAILED DESCRIPTION

Figure 1A:
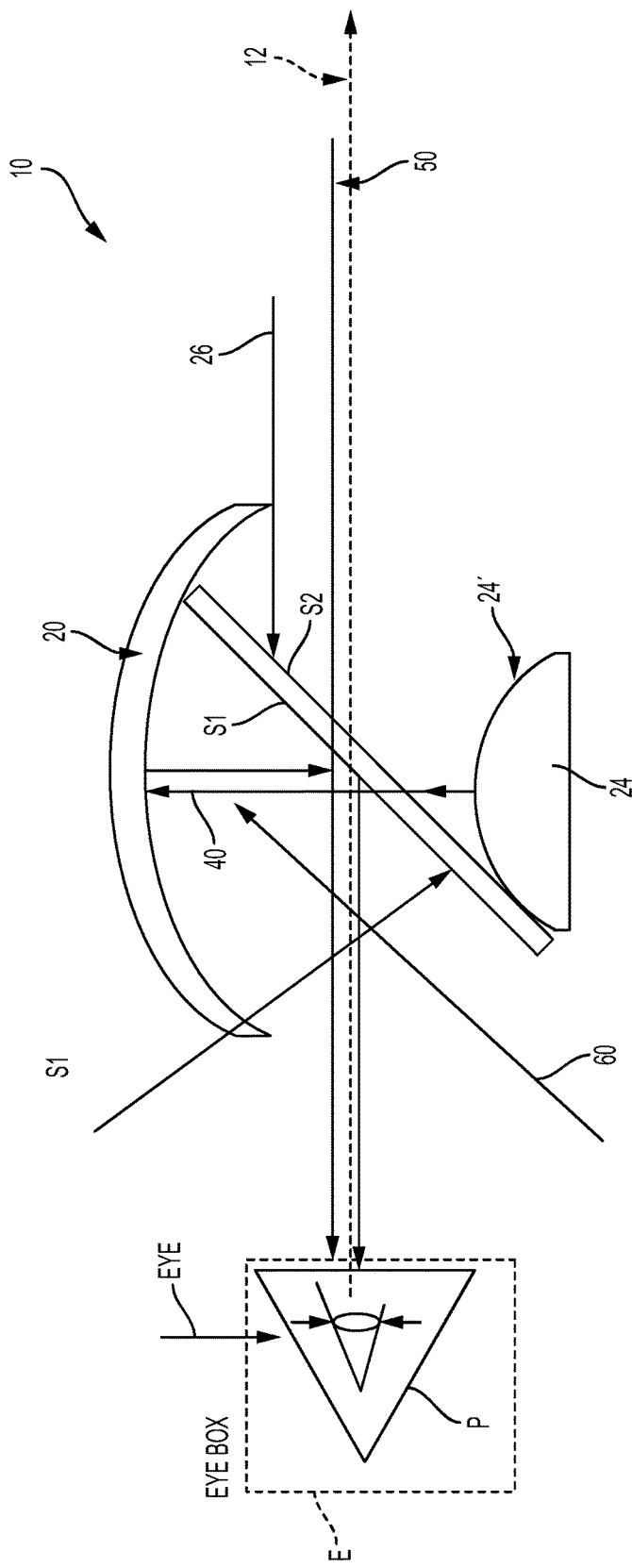
FIG. 1A is a schematic side view that shows optical characteristics and relationships for forming a virtual image to the eye of a viewer.

Figures shown and described herein are provided in order to illustrate key principles of operation and fabrication for an optical apparatus according to various embodiments and a number of these figures are not drawn with intent to show actual size or scale. Some exaggeration may be necessary in order to emphasize basic structural relationships or principles of operation.

The figures provided may not show various supporting components, including optical mounts, power sources, image data sources, and related mounting structure for standard features used in a display device. It can be appreciated by those skilled in the optical arts that embodiments of the present invention can use any of a number of types of standard mounts and support components, including those used with both wearable and hand-held display apparatus.

In the context of the present disclosure, terms such as "top" and "bottom" or "above" and "below" or "beneath" are relative and do not indicate any necessary orientation of a component or surface, but are used simply to refer to and distinguish views, opposite surfaces, spatial relationships, or different light paths within a component or apparatus. Similarly, terms "horizontal" and "vertical" may be used relative to the figures, to describe the relative orthogonal relationship of components or light in different planes relative to standard viewing conditions, for example, but do not indicate any required orientation of components with respect to true horizontal and vertical orientation.

Where they are used, the terms "first", "second", "third", and so on, do not necessarily denote any ordinal or priority relation, but are used for more clearly distinguishing one element or time interval from another. These descriptors are used to clearly distinguish one element from another similar element in the context of the present disclosure and claims.

The terms "viewer", "observer", and "user" can be used interchangeably in the context of the present disclosure to indicate the person viewing an image from a personal display apparatus.

As used herein, the term "energizable" relates to a device or set of components that perform an indicated function upon receiving power and, optionally, upon receiving one or more enabling signals. For example, a light source is energizable to emit a beam of light and can be modulated for image presentation according to image data signals.

In the context of the present disclosure, two planes, direction vectors, or other geometric features are considered to be substantially orthogonal when their actual or projected angle of intersection is within +/−4 degrees of 90 degrees.

In the context of the present disclosure, the term "oblique" or phrase "oblique angle" is used to mean a non-normal angle that is slanted so that it differs from normal, that is, differs from 90 degrees or from an integer multiple of 90 degrees, by at least about 4 degrees or more along at least one axis. For example, an oblique angle may be at least about 4 degrees greater than or less than 90 degrees using this general definition.

In the context of the present disclosure, the term "coupled" is intended to indicate a mechanical association, connection, relation, or linking, between two or more components, such that the disposition of one component affects the spatial disposition of a component to which it is coupled. For mechanical coupling, two components need not be in direct contact, but can be linked through one or more intermediary components.

In the context of the present disclosure, the term "left eye image" describes a virtual image that is viewed by the left eye of the viewer and a "right eye image" describes a corresponding virtual image that is viewed by the right eye of the viewer. The phrases "left eye" and "right eye" may be used as adjectives to distinguish imaging components for forming each image of a stereoscopic image pair, as the concept is widely understood by those skilled in the stereoscopic imaging arts.

The term "at least one of" is used to mean one or more of the listed items can be selected. The term "about" or "approximately", when used with reference to a dimensional measurement or position, means within expected tolerances for measurement error and inaccuracy that are accepted in practice. The expressed value listed can be somewhat altered from the nominal value, as long as the deviation from the nominal value does not result in failure of the process or structure to conform to requirements for the illustrated embodiment.

With relation to dimensions, the term "substantially" means within better than +/−12% of a geometrically exact dimension. Thus, for example, a first dimensional value is substantially half of a second value if it is in the range of from about 44% to about 56% of the second value. Positions in space are "near" each other or in close proximity when, relative to an appropriate reference dimension such as a radius of curvature, a focal point, a component location, or other point on an optical axis, distance dimensions are substantially the same, no more than about 12% apart, preferably within 5%, 3%, 1% or less distance from each other.

The term "actuable" has its conventional meaning, relating to a device or component that is capable of effecting an action in response to a stimulus, such as in response to an electrical signal, for example.

The term "in signal communication" as used in the application means that two or more devices and/or components are capable of communicating with each other via signals that travel over some type of signal path. Signal communication may be wired or wireless. The signals may be communication, power, data, or energy signals which may communicate information, power, and/or energy from a first device and/or component to a second device and/or component along a signal path between the first device and/or component and second device and/or component. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

The term "exemplary" indicates that the description is used as an example, rather than implying that it is an ideal.

With respect to positions of components or centers of curvature or other features of an optical apparatus, the term "near" has its standard connotation as would be used by one skilled in the optical design arts, with consideration for expected manufacturing tolerances and for measurement inaccuracies, for example, as well as for expected differences between theoretical and actual behavior of light.

As is well known, the light distribution within and from a specific optical system depends on its overall configuration, which need not be geometrically perfect or exhibit ideal symmetry for suitable performance. For example, the light distribution for a curved mirror can more accurately described as focused on a small region that is substantially centered about a focal point; however, for the purposes of description, the conventional terms such as "focal point" or "focal region" are used. The term "eye box" denotes a region from which a virtual image formed by an optical system can be viewed.

When a scene is viewed from a single position and is presented to the observer at both eye positions the view lacks the perception of depth, the third dimensional effect. A scene viewed in this way is called bi-ocular. However, when a single scene is viewed from two positions spaced even slightly from one another, the view presented to the observer has the sense of depth. A scene viewed in this way is called binocular. A scene viewed from one eye position and produced from one position is called monocular and lacks the third dimensional effect.

As is well known to those skilled in the imaging arts, a virtual image is synthetically simulated by divergence of light rays provided to the eye from an optical system and viewed in space at an eye box. An optical system forms a virtual image that appears in the field of view of a viewer at a given position and distance. There is no corresponding "real" object in the field of view from which the rays actually diverge. So-called "augmented reality" viewing systems employ a virtual imaging system to provide superposition of the virtual image onto the real-world object scene that is viewed along a line of sight of the viewer. This capability for forming a virtual image that can be combined with object scene image content in the viewer's field of view distinguishes augmented reality imaging devices from other display devices that provide only a virtual image to the viewer without allowing the light from a real scene to be viewed simultaneously.

Referring to the schematic diagram of FIG. 1A, there is shown, in side view representation, a virtual image forming apparatus 10 that forms a virtual image for view by an eye pupil P in an eye box E. A beam splitter plate 26 (alternately termed a plate beamsplitter, beamsplitter, or beam splitter) having first and second parallel surfaces S1 and S2 is obliquely disposed along a viewer line of sight 12 and is spaced apart from, and disposed in free space between, an image generator 24 having for providing an image, and a reflective component Rc. In the embodiment illustrated, image generator 24 is a display source having a display surface 24' for providing an image. In some embodiments, as shown in FIG. 1A, the surface 24' of the image generator is curved and thus generates a curved field of image bearing light. For example, the display surface may be a cylindrical surface of a "smart watch" or wrist wearable device.

FIG. 1A illustrates that in this embodiment reflective component Rc has a reflective surface 20 that is concave with respect to image generator 24. The reflective surface 20 reflects light back toward the image generator 24 A principal axis A of the reflective surface 20 is substantially parallel and preferably collinear (and preferably is collinear) to the principal axis A' of the display surface 24' of the image generator 24.

Image generator 24 is energizable to direct image-bearing light toward spaced-apart surface S2 of beam splitter plate 26. Image generator 24, beam splitter plate 26, and reflective component Rc cooperate and are structured to form a virtual image that is viewable along line of sight 12 at eye box E. In some embodiments the image generator 24 may be situated above the viewer's eye, and the reflective component Rc s is situated below viewer's eyes. In some embodiments the image generator 24 may be situated below the viewer's eye, and the reflective component Rc is situated above viewer's eyes.

In some exemplary embodiments curved display surface 24' is essentially cylindrical, i.e. this surface is curved in one cross-section such that it has a radius R1d that is <100 mm, preferably not greater than 60 mm, e.g., 20-60 mm); in another cross-section this surface is essentially planar or planar (with a radius of curvature R2d>100 m, preferably >500 m and more preferably ∞)

The curved surfaces of display surface 24' and that of the reflective component (reflective surface 20) are substantially concentric. In some embodiments, the curved display surface 24' and the reflective surface 20 are concentric to within 5 mm. When the curved display surface 24' and the reflective surface 20 are concentric to within 5 mm the virtual image formed by the display apparatus and presented to the viewer is substantially in focus across the total curved FOV (preferably in horizontal direction)

Figure 1B:
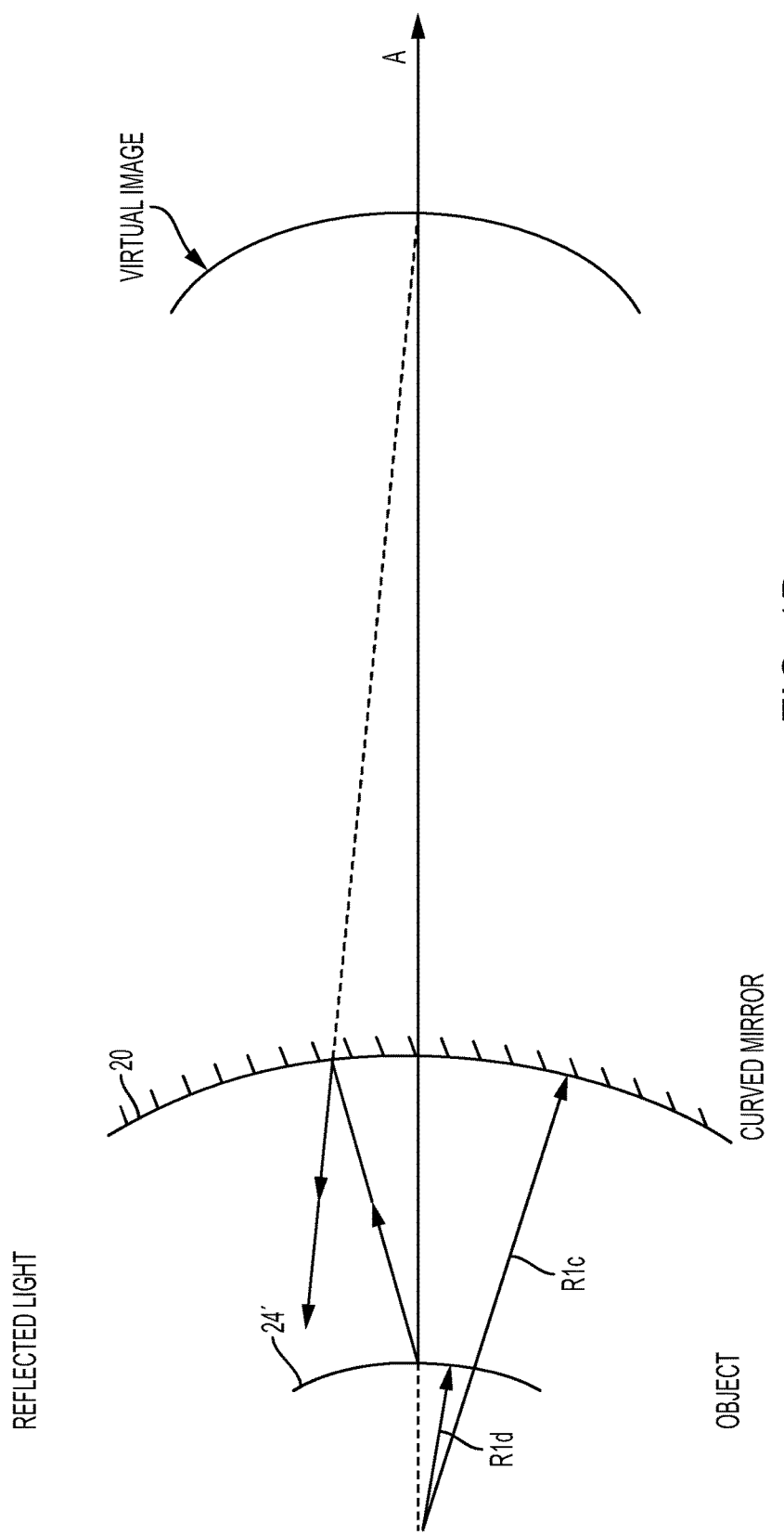
FIG. 1B is schematic illustration that shows relationships for between optical components shown in FIG. 1A.

In some embodiments, the curved display surface 24' and the reflective surface 20 are concentric to within 3 mm. In some embodiments, the curved display surface 24' and the reflective surface 20 are concentric to within 2 mm. In some embodiments, the curved display surface 24' and the reflective surface 20 are concentric to within 1 mm. In some embodiments, the curved display surface 24' and the reflective surface 20 are concentric to within 0.5 mm. Preferably, the curved display surface 24' and the reflective surface 20 are concentric. (See, for example, FIG. 1B.) When the curved display surface 24' and the reflective surface 20 are concentric, the virtual image formed by the display (and more specifically by the reflective surface 20 having a radius of curvature HI) and presented to the viewer is in focus across the total curved FOV (in the direction of the field of view of the display, which is preferably in horizontal direction).

Thus, according to some embodiments the display apparatus comprises:
    (a) at least one image generator 24 having a curved display surface 24' that generates image-bearing light 60, the curved display surface having at least one radius of curvature $r1_d$;
    (b) a reflective component Rc spaced apart from the image generator 24, the reflective component having Rc an incident reflective surface 20 concave to the image generator 24 having a radius of curvature $r1_r$, the reflective component Rc having the incident reflective surface 20 that is structured and disposed so as to create a virtual image of the curved display surface 24' (See, for example, FIG. 1B); and
    (c) a beam splitter plate 26 disposed in free space between the image generator 24 and the reflective component Rc, beam splitter plate 26 having first and second surfaces S1, S2 that are oblique to a line of sight of a viewer,
wherein the reflective component a Rc, and the beam splitter plate define 26a viewer eye box for the image-bearing light along the line of sight of the viewer, wherein the curved display surface 24' and the curved reflective surface 20 are substantially concentric in at least one cross-section (e.g., in a horizontal direction).

According to some embodiments described herein, an augmented reality display comprises left display apparatus for a left viewer eye and a right display apparatus for a right viewer eye, wherein each left and right display apparatus comprises the display apparatus described above. As described above, in at least some embodiments an augmented reality display device comprises a left display apparatus for a left viewer eye and a right display apparatus for a right viewer eye. If two separate image generators (each with a display surface 24') are utilized in these embodiments, each of these two display apparatuses is structured such that the principal axis A of the reflective surface 20 of each display apparatus is substantially collinear (and preferably is co-linear) to the principal axis A' of the display surface 24' of the corresponding image generator 24.

Beam splitter plate 26 and reflective component Rc define, for an image for a single eye, an optical path 40 along which the light from beam splitter plate 26 is conveyed through free space for a first direction to be incident on the reflective surface 20 of the reflective component Rc. The light is then reflected from the reflective surface 20 and then continues back along optical path 40 traveling through free space and back to beam splitter plate 26. Surface S1 of the beam splitter plate 26 reflects the light coming back from the reflective component Rc along an uninterrupted path toward the viewer eye box E along line of sight 12 of a viewer, wherein line of sight 12 for the object scene extends through beam splitter plate 26. Beam splitter plate 26 provides a slanted window through which the object scene is viewable. Thus the beam splitter is structured and positioned such that the image bearing light generated by the image generator traverses the beam splitter as it propagates toward the reflective component Rc, and is reflected from the beam splitter after it is reflected by the reflective component Rc. According to some embodiments beam splitter plate 26 weighs less than 25 grams (e.g., <20 grams, <15 grams, <10 grams) and provides a horizontal full field of view that is at least 30 degrees, and in some embodiments exceeds 40 degrees (e.g., 40-70 degrees, for example 50-60 degrees). In some embodiments the beam splitter plate 26 weighs 2-10 grams, for example no more than 5 grams, and in some embodiments 2 to 5 grams. According to some embodiments the beam splitter plate 26 has a partially reflecting surface, the partially reflecting surface is positioned to face the reflective component(s) Rc. In the exemplary embodiments described herein the partially reflective surface reflects at least 25% of the light (e.g., 25% to 75%, or 30% to 70%, or 40 to 60% or 45 to 65%) in the visible spectrum transmits, and transmits at least 25% of the light (e.g., 25% to 75%, or 30% to 70%, or 40 to 60% or 45 to 65%) in the visible spectrum transmits. For example, the partially reflective surface my: (i) transmit 45% of light and reflect 55% of light, or (ii) may transmit 50% of light through, and reflect 50% of light back, or (ii) may transmit 55% of light and reflect 45% of light in the visible spectrum.

According to some embodiments the display surface 24' is cylindrical, and the incident reflective surface concave of the reflective component Rc is rotationally symmetric. In some embodiments the display surface is toroidal, and the incident reflective surface concave of the reflective component is rotationally symmetric.

The curved reflective surface 20 of the reflective component a Rc is preferably rotationally symmetric, and according to some embodiments is spherical with a radius of curvature $r1_r$. In some embodiments the curved display surface 24' is cylindrical with the radius of curvature $r1_d$. Preferably the centers of curvatures of the two surfaces are located near one another, more specifically within 5 mm of one another—i.e., the two radii $r1_d$ and $r1_r$ are originating at the same, or nearly the same point. For example, in some the centers of curvatures of the two surfaces Rc and 24' are situated within 3 mm, and in some embodiments within 1 mm of one another.

This configuration advantageously allows one to obtain a well focused image even when the curved field of view exceeds 40 degrees.

According to the embodiments described herein, it is preferable that $2.1 \geq r1_r/r1_d > 1.5$. In some embodiments 120 mm$\geq r1_r \geq 60$ mm and 60 mm$\geq r1_d \geq 30$ mm. In some embodiments 100 mm$\geq r1_r \geq 50$ mm and 50 mm$\geq r1_d \geq 45$ mm. For example, in some embodiments 100 mm, $r1_d$=50 mm and $r1_r/r1_d$=2. For example, in some embodiments $r1_r$=100 mm and $r1_d$=55 mm. In some embodiments $r1_r$=80 mm and $r1_d$=45 mm.

As referred to herein "curved image field" refers to the curved image plane across the field of view". As referred to herein, a "curved field of image" and "curved field of image-bearing light" generated by the image generator 24, refers to a curved display surface 24' or the light emanating from this surface across the (object) field of view displayed by the source 24.

Image distortion could alternately be corrected using one or more additional lenses L1, L2 (not shown) in the optical system. However, distortion can also be digitally corrected in a straightforward manner, by appropriate adjustment to the image data.

Figure 2:
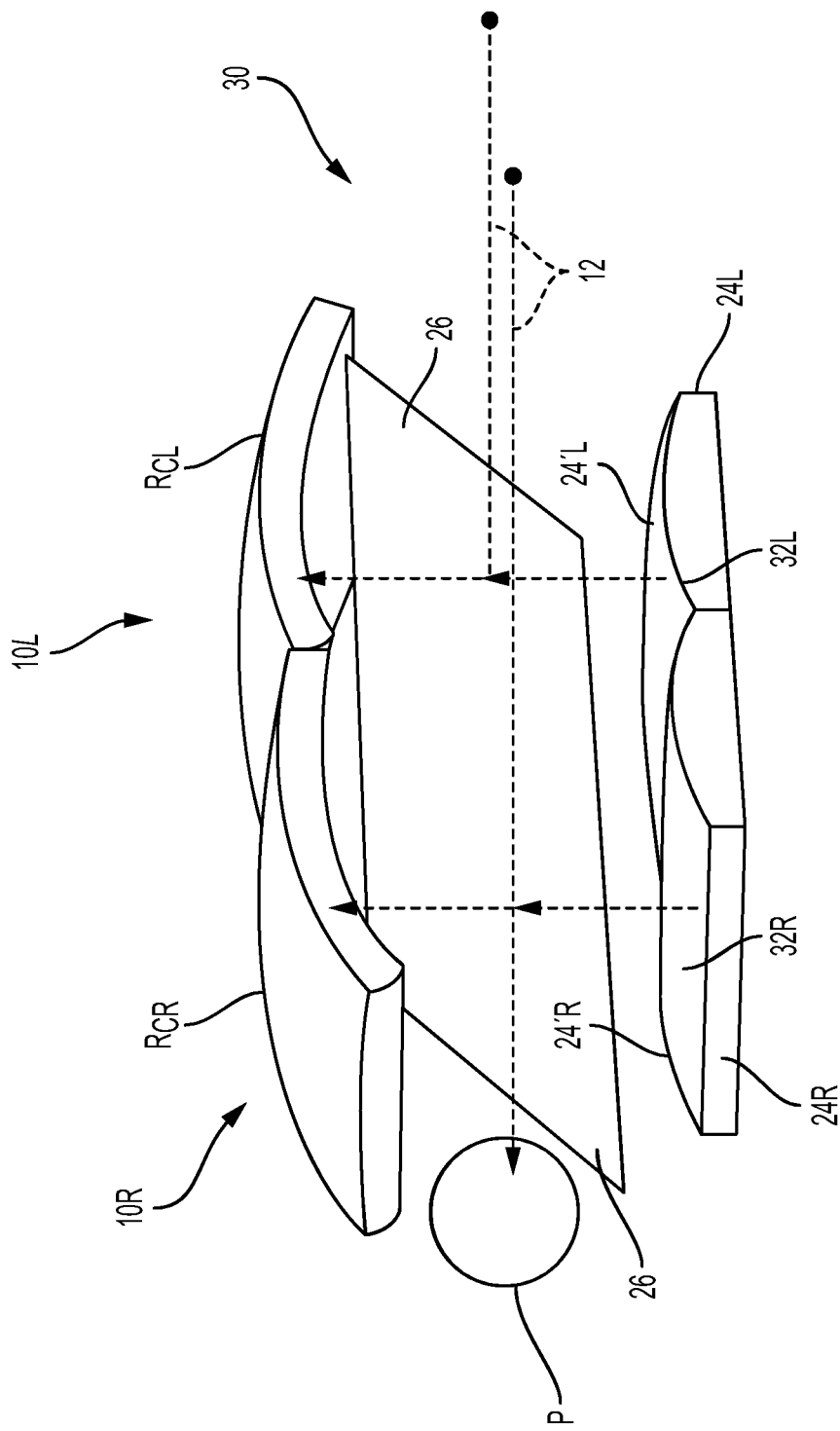
FIG. 2 is a perspective view showing a display apparatus for forming a binocular or stereoscopic image at a viewer eye box.

FIG. 1A showed the arrangement of components of virtual image forming apparatus 10 (of the display apparatus 30) for forming a single left-eye or right-eye image. The schematic drawing of FIG. 2 shows a perspective view from the front of a configuration of display apparatus 30 with for providing left-eye and right-eye image content, from different portions of the display surface, to respective pupils P (viewer's eye pupils) at each corresponding eye box. More specifically, FIG. 2 shows how a display apparatus 30 forms a binocular virtual image, with left-eye and right-eye images viewable at respective eye boxes EL and ER using a single beam splitter plate 26.—In this embodiment two image generators 24l, 24r with respective curved s(cylindrical) surfaces 24'l, and 24'r generate real left-eye and right-eye images, 32L and 32R, respectively. A curved field of image-bearing light from left-eye image 32L transmits through beam splitter plate 26 and left reflective component $R_{CL}$. With this arrangement, image generator 24L and reflective component $Rc_L$ form a left-eye virtual image forming apparatus 10L in cooperation with beam-splitter plate 26.—Similarly, a curved field of image-bearing light from right-eye image 32R transmits through beam splitter plate 26 and right reflective component $R_{CR}$. Image generator 24R and reflective component $Rc_L$ form a right-eye virtual image forming apparatus 10R with beam splitter plate 26. The use of a single beam splitter plate 26 and two reflective components $R_{CL}$, $R_{CR}$ for defining eye box positions for both left- and right-eye virtual images is advantageous for reducing parts count and simplifying component mounting. The arrangement of FIG. 2 is capable of providing stereoscopic viewing when provided with appropriate left- and right-eye image content. The image content can be stereoscopic or can alternately be non-stereoscopic.

FIG. 3 shows a side view corresponding (for simplicity) to only one eye portion (either left or right) of virtual image forming apparatus 10 of the shown in FIG. 2 Of course there are two (right and left eye) image forming apparatus, and there is a corresponding left or right line of sight 12 for the corresponding left or right eye As shown in FIGS. 2 and 3, each image generator 24R, 24R has a cylindrical surface 24'R, 24'R, while the surface 20 of the reflective component 20 is spherical. It is noted that each eye's field of view may be horizontally non-symmetric. That is, the field of view to the outside of the eye, the peripheral field extending horizontally to the right and left, may be larger than the field of view to the inside of the eye.

Figure 4A:
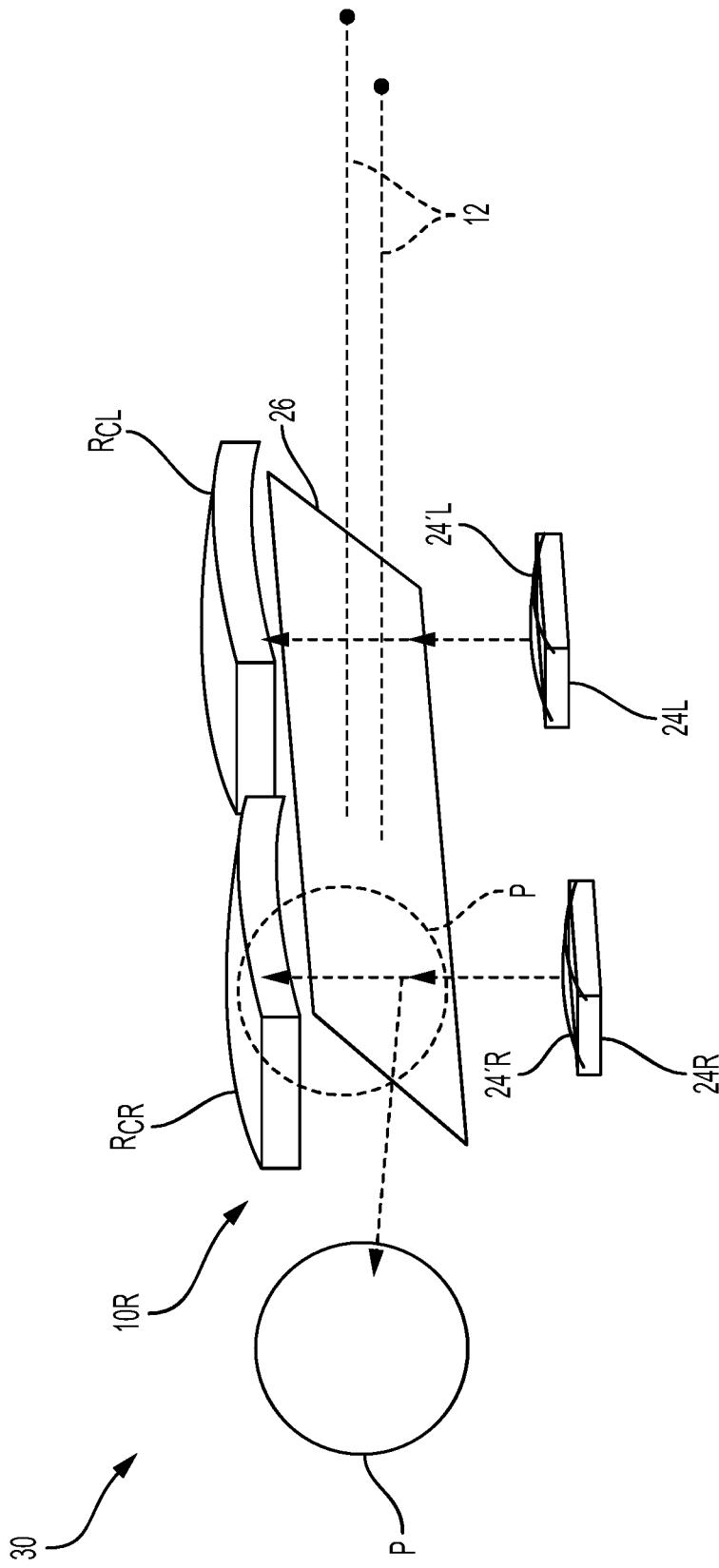
FIGS. 4A, 4B, and 4C are perspective, side, and front views respectively of one embodiment of the display apparatus.
Figure 4B:
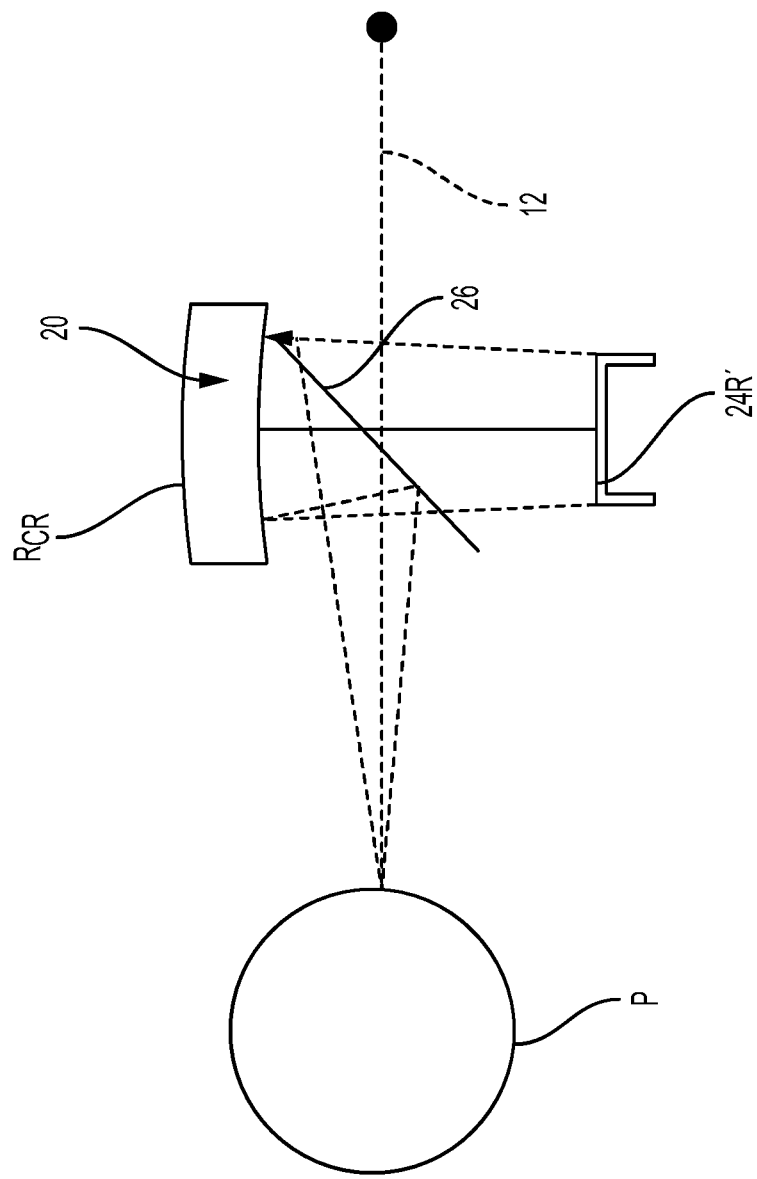
Figure 4C:
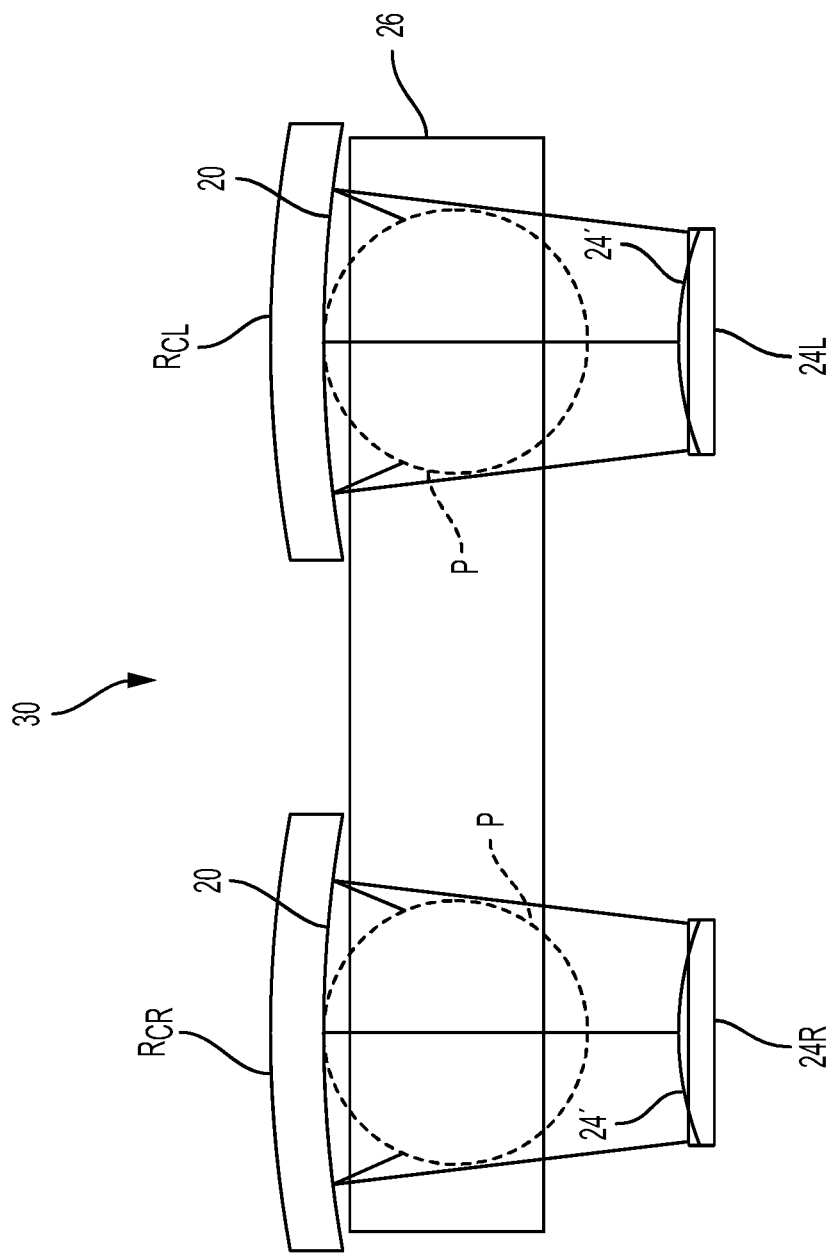

FIG. 4A shows a perspective view of another embodiment, FIG. 4B a side view, and FIG. 4C a front plan view of an embodiment that uses separate left- and right-eye image generators, 24L and 24R, respectively. Image generators 24L and 24R can lie in the same plane or may be offset from each other, tilted or adjusted for improved packaging or to adjust for viewer anatomy, for example.

Figure 5A:
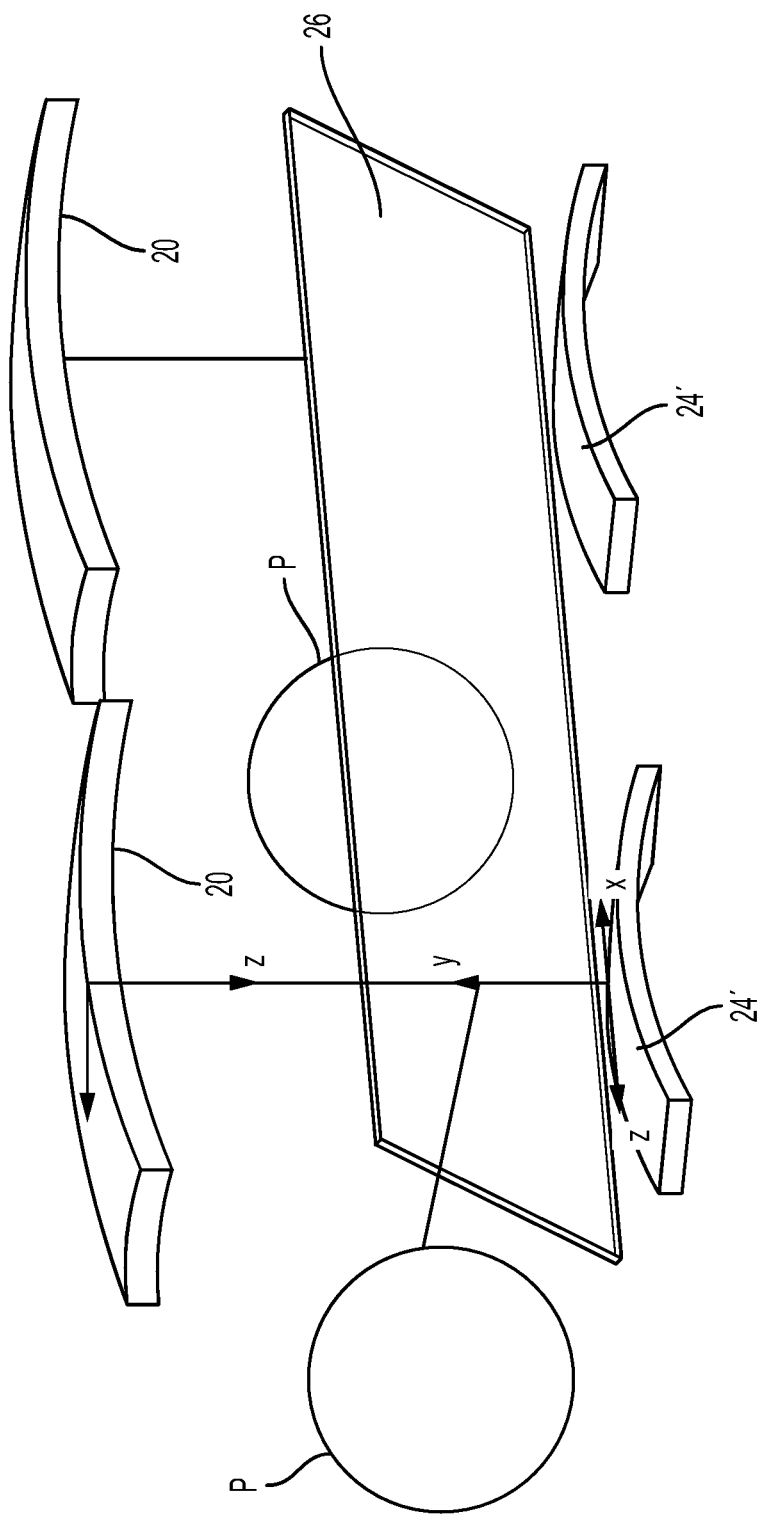
FIGS. 5A and 5B are perspective views of another alternate embodiment of the display apparatus.
Figure 5B:
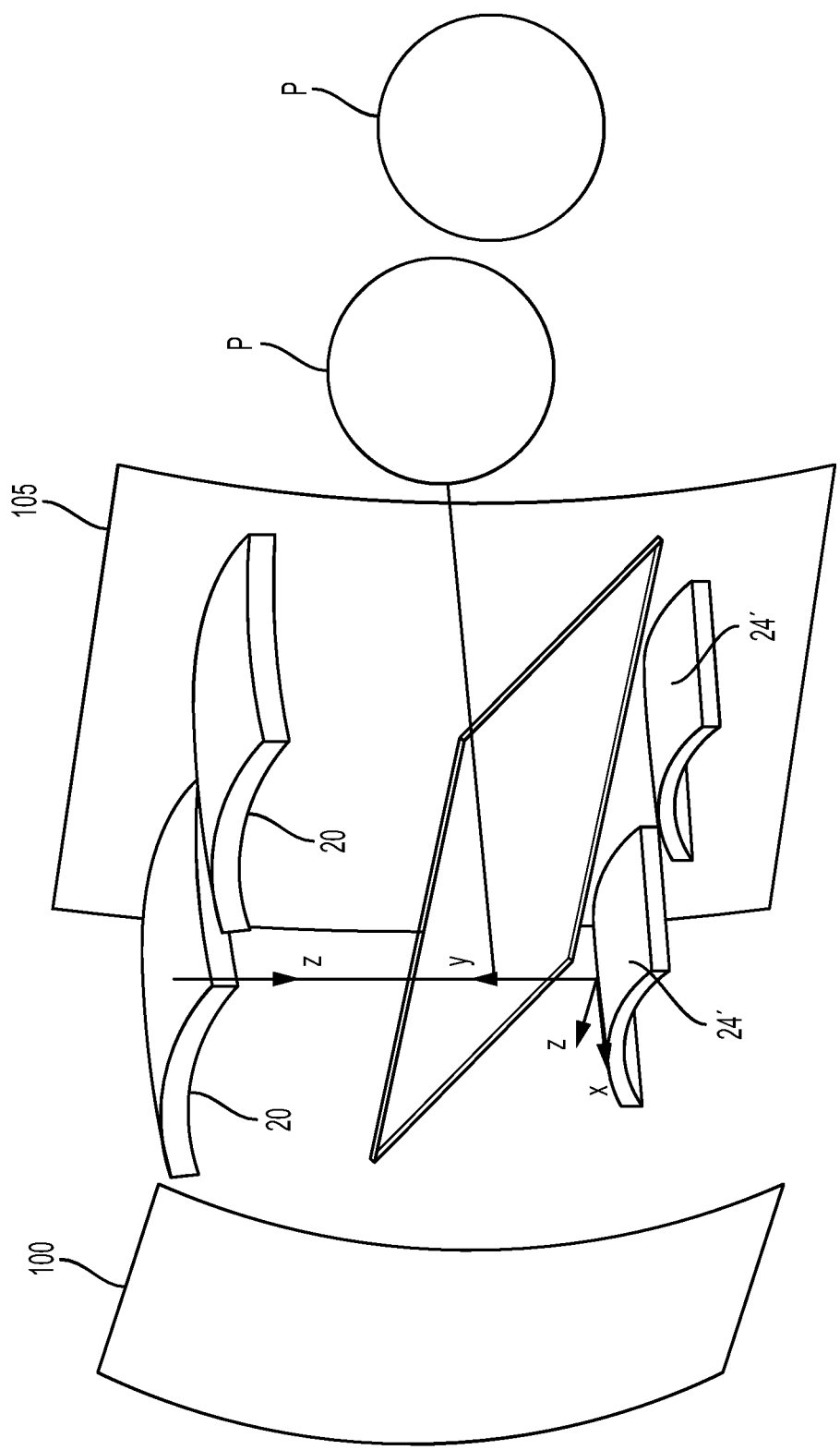

FIGS. 5A and 5B illustrate perspective view, of another embodiment that uses a single beam splitter plate 26 with separate left- and right-eye image generators, 24L and 24R, respectively. This alternate arrangement may be useful, for example, for providing more compact packaging.

The embodiments of FIGS. 1-5B may be utilized, for example, with either LCD or OLED based image generation devices. In one embodiment, LED based image generation devices have pixels that are less than or equal to 44 microns× 44 microns. In one embodiment, such OLED based image generation devices have pixels that are less than or equal to 44 microns×44 microns, 40 microns×40 microns, 30 microns×30 microns, 24 microns×24 microns, 20 microns× 20 microns, or the image generation devices device may even have even smaller sized pixels. Other image generation devices may also be utilized.

The display designs disclosed herein may result in an eye relief distance (i.e. the horizontal distance between the eye pupil and the closest edge of the beam splitter) between 8 mm and 40 mm (e.g., 10 mm to 30 mm), a horizontal FOV between 30 and 70 degrees (e.g., 40 to 70 degrees) and resolution between 1 min per pixel and 7 min/pixel. In some embodiments the resolution is 4 min per pixel. In some embodiments the resolution is 2 min per pixel A resolution of about 1 min/pixel can be achieved, for example, if one uses a an image generator such as an OLED display with 20×20 μm pixels. According to some embodiments, the reflective surfaces 20 of reflective component $R_C$ are structured such that the optical axes of the reflective surfaces 20 are parallel to each other within 1 minute of arc and spaced by each other by a distance between 50 mm and 80 mm (e.g., 60-70 mm). The optical system of the display apparatus further comprises an exit pupil having an exit pupil diameter Dp≥7 mm, for example 7 mm≤Dp≤20 mm (e.g., 8 mm, 10 mm, 12 mm, 15 mm, 18 mm, 20 mm, or therebetween).

According to some embodiments the optical system further comprises an exit pupil with exit pupil diameter Dp≥7 mm and also has a vertical full field of view FOVv and a horizontal full field of view FOVh such that the ratio of the horizontal field of view to the vertical field of view is FOVh/FOVv>1.5. In some embodiments FOVh/FOVv>1.7, for example 3≥FOVh/FOVv>1.7.

According to some embodiments the distance between the image generator 24 and the reflective components $R_C$ is 20-60 mm, for example 30-50 mm, or 20-45 mm, 30-45 mm, or 35-45 mm.

According to some embodiments the display apparatus exhibits at least one of: (a) horizontal field of view between 30 and 70 degrees, an eye relief distance between 5 mm and 50 mm, focal length of the reflective component Rc between 30 mm and 60 mm; an exit pupil diameter between 7 mm and 20 mm, and a distance between the Reflective component $R_C$ and the display surface 24' of 30 mm to 70 mm; or (b) an eye relief distance between 5 mm and 40 mm, a horizontal FOV between 30 and 70 degrees and resolution between 1 min/pixel and 4 min/pixel. According to some embodiments the display apparatus exhibits no lateral chromatic aberration. (Lateral color is a variation of magnification with color (red, green, and blue (R,G,B)). According to some embodiments the display apparatus exhibits lateral chromatic aberration that is less than the size of a pixel—i.e., so that R, G, and B rays fall within the same pixel. According to some embodiments the display apparatus exhibits lateral chromatic aberration that is not greater than pixel size of the image generator.

Table 1, below, provides a list of that various performance characteristics of several exemplary corresponding to FIGS. 4b-4c. In Table 1 embodiments curved display surface 24' is cylindrical, i.e., in one cross-section this surface is curved and has it has a radius R1d that is <100 mm, preferably not greater than 60 mm, and in another cross-section this surface is essentially planar).

TABLE 1

Performance for Exemplary Embodiments

| | FOV degrees (H × V) | Display surfaces radius $r1_d$ | Eye relief | Effective Focal Length (EFL) of the reflective component $R_C$ | Beam splitter plate size | Angular resolution (note 1) |
|---|---|---|---|---|---|---|
| Embodiment 1 | 42 × 21 | 46 mm | 30 mm | 45.5 mm | 120 × 50 mm | 5.9 min/pixel |
| Embodiment 2 | 42 × 22.5 | 30 mm | 20 mm | 28 mm | 100 mm × 30 mm | 6 min/pixel |
| Embodiment 3 | 60 × 30 | 60 mm | 30 mm | 58 mm | 120 × 50 mm | 3 min/pixel |
| Embodiment 4 | 30 × 17.5 | 30 mm | 20 mm | 28 mm | 11 × 30 mm | 3 min/pixel |

Note 1:
Angular resolution values of the embodiment 1 and 2 of Table 1 are based on commercially available devices with (about 500 pixels per inch). Embodiment 3 utilizes a display device with 500 pixels/inch. Embodiment 4 utilizes a display device with 1040 pixels/inch).

It should be noted that the field of view of the viewer for the object scene (that is, for real objects in the field of view of the viewer) is larger than the field of view within which the virtual image is formed. The optical arrangement of the disclosed embodiments provides a large field of view (FOV) for an augmented reality display.

Advantageously, the beam splitter plate is lightweight. According to an exemplary embodiment, a beam splitter plate suitable for a greater than 40 degree horizontal FOV, such as an 80×150 mm beam splitter plate, weighs less than 25 grams. The optical thickness between surfaces of the beam splitter plate is less than 3 mm (e.g., 0.5 mm, 1 mm, 1.5 mm, 2 mm or therebetween).

By comparison, other proposed augmented reality display designs use prisms. A prism-based optical system, however, requires a correspondingly large prism in order to provide a large FOV, making it difficult to scale prism-based designs to large FOV application. A head-mounted apparatus using a single beamsplitter prism for a nominal 40 degree horizontal FOV for both eyes must support prism weight that is well in excess of 700 grams. The added weight of a large prism effectively constrains the available FOV, as well as adding considerable bulk and weight.

Figure 6:
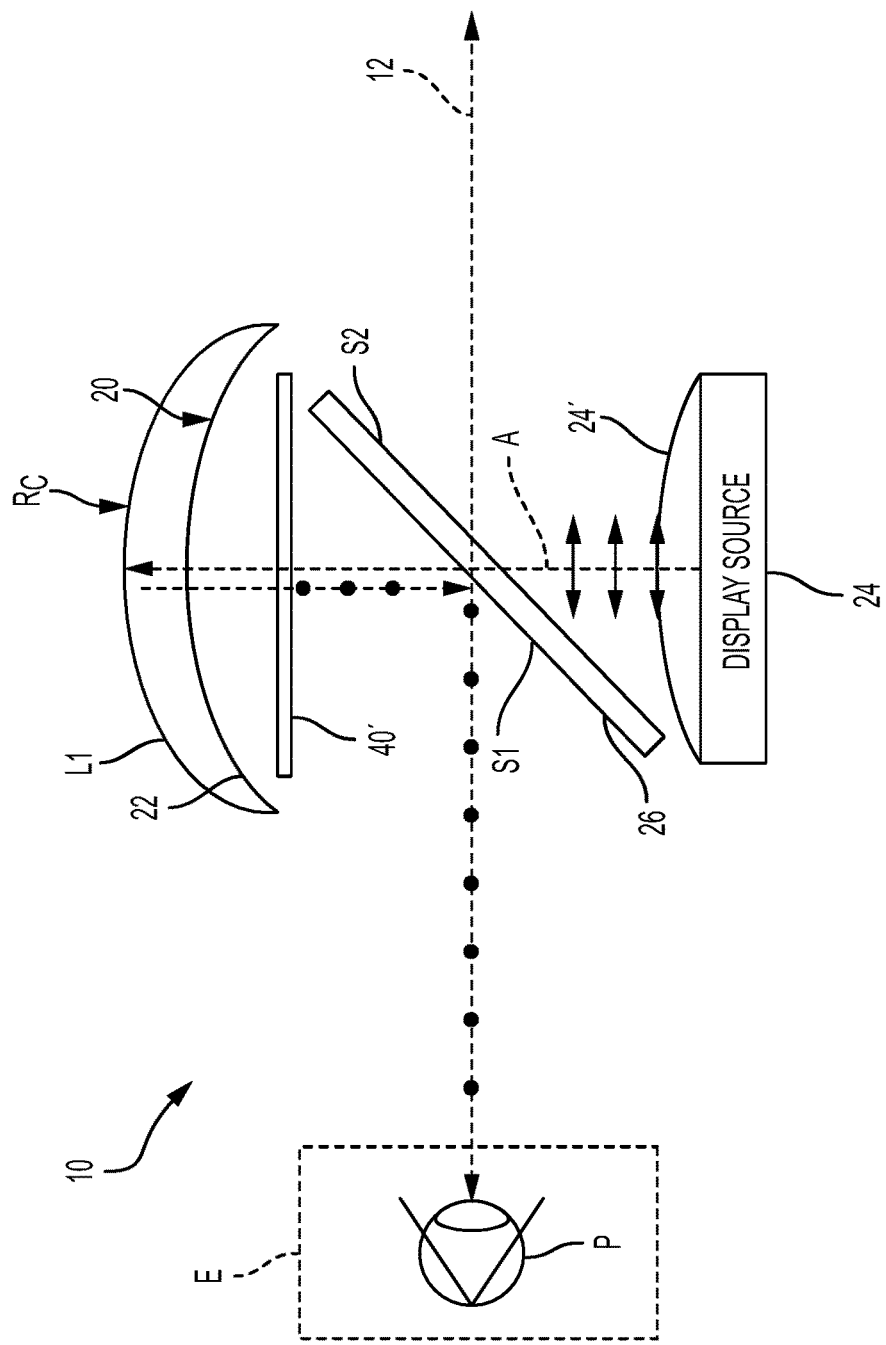
FIG. 6 is a schematic side view of an alternate embodiment that uses polarization for directing light at the beam splitter plate.

The schematic side view of FIG. 6 is similar to that of FIG. 1A, but the embodiment of FIG. 6 utilizes polarization for directing light at beam splitter plate 26. As shown in FIG. 6, Image generator 24 with a curved surface 24' provides image content as polarized light having a first polarization state (for example, p-polarization). Beam splitter plate 26, configured as a polarization beam splitter, transmits the first state (p-polarization, shown by arrows) and reflects the orthogonal state (s-polarization, shown by dots). Two transits (passes) through a quarter wave plate 40' transform the first (p) polarization state into the orthogonal (s) polarization state for reflection from beam splitter plate 26. The wave plate 40' may be a quarter wave retarder (also referred to herein ¼ wave plate). The wave plate 40' may be an achromatic ¼ wave plate. Preferably the wave plate 40' is achromatic across the visible spectrum. In the embodiment of FIG. 6 the wave plate 40' is situated between the reflective component Rc and the beam splitter plate 26.

Image Generator

As used herein, image generator 24 can be any source that can emit image-bearing light for forming images for one or both eyes of the viewer, including a hand-held personal communications device, smartphone, pad, computer screen, or other display source or image projection source. In some embodiments the image generator is capable of emitting a flat image-bearing light, that is, the image is not a curved image being transmitted. Image generator devices that can be used can include curved-panel personal communications devices such as cellular phones, so-called "smartphones" that provide some type of mobile operating system, feature phones having at least some measure of computing and display capability, "smart watches", and various types of electronic pads, and similar devices that include at least a display area capable of displaying graphic content. The apparatus of the present disclosure is particularly well suited to applications that use images generated from a portable, personal communications device such as cell phone or a smart watch, as can clearly be seen from the values given in the preceding Table. In some embodiments the image generator 24 is a smartphone device that incorporates at least one of: GPS sensor, a first camera for viewing and taking pictures of a scene viewed by the user, and an additional camera "selfie camera" that is facing in a direction opposite of the first camera.

Image generator 24 can be any image producing source, and does not have to be capable of being used as an image display device by the human eye. According to some embodiments the image generator is a curved screen with an image projection projected on it by another device (e.g., a projector).

Other types of image generators that can be suitably adapted for generating image-bearing light include various types of spatial light modulator (SLM) components. Various types of SLM devices can be used, including a Digital Light Processor (DLP) from Texas Instruments, Dallas, Tex.; a liquid crystal device (LCD), an organic light emitting diode (OLED), an LCOS (liquid crystal on silicon) device, or a grating electromechanical device, for example. A linear light modulator could alternately be used.

Beam Splitter Plate 26

Advantageously, with embodiments described herein, only beam splitter plate 26 lies in the line of sight 12 of the viewer. This arrangement provides a horizontal field of view (FOV) for the object scene content that is very wide, with a view that is only slightly offset vertically from an unobstructed line of sight by the glass plate.

According to an embodiment, beam splitter plate 26 can be formed on a glass substrate having surfaces that are parallel to within tight tolerances, such as to within less than 50 arc seconds, more advantageously within 30 arc seconds, or even within 20 arc seconds. In some embodiments glass substrate of the beam splitter 26 has surfaces that are parallel to within less than 10 arc seconds (e.g., 8 to 10 arc seconds). Parallel surfaces are highly advantaged, minimizing ghosting and other effects that can result from even slightly wedged beam splitter surfaces.

Beam splitter plate 26 can be formed on a sheet of glass obtained using fusion draw processing. This method provides a glass sheet with highly parallel opposite sides. Standard types of glass may require double-sided polishing to reduce ghosting which can occur if beam splitter plate surfaces are not highly parallel.

Ideally, beam splitter plate 26 is as thin as possible, to allow for as large a field of view as possible. In some embodiments, the beam splitter plate 26 has a width less than 4 mm, more preferably less than 3 mm, even more preferably less than 2 mm, and even more preferably less than 1 mm (for example, 0.3 to 0.7 mm). By incorporating a beam splitter having such small thickness, when the image-bearing light is reflected off of both surfaces toward the viewer's eye, the distance between these two reflections is small enough that the viewer does not "see" a double image. In some embodiments the beam splitter plate 26 has a first and a second major surfaces and these surfaces of the beam splitter plate are parallel tone another to within 50 arc seconds. In some embodiments the beam splitter plat 26 has a first and a second major surfaces and these surfaces of the beam splitter plate are parallel to one another to within 1 arc minute, or to within 75 arc seconds, more preferably within 55 arc seconds, within 45 arc seconds, and even more preferably to within 40 arc seconds. In some embodiments the beam splitter plate 26 has a first and a second major surfaces and these surfaces of the beam splitter plate are parallel to one another to within 30 or even within 20 arc seconds. The beam splitter plate may be made, for example fusion formed glasses available from Corning Incorporated and may have surfaces parallel to within 10 arc seconds (e.g., 4 to 10 arc sec. In some embodiments, the beam splitter plate 26 has a flatness less than 20 microns, peak to valley (PV) and a variation of thickness less than 0.025 mm (over the central 90% area of the glass (e.g., at least over 95% of the glass area) or at least in the area through which the image is being viewed). In some embodiments, the beam splitter plate 26 has a flatness less than 10 microns (peak to valley) and a variation of thickness less than 0.02 mm (e.g., 0.002 mm to 0.01 mm). In some embodiments, the beam splitter plate 26 has a flatness less than 7 microns PV (e.g., 4 or 5 microns PV) and a variation of thickness less than 0.015 mm, or even 0.01 mm or less (e.g., 0.002 mm, 0.005 mm, or 0.01 mm or therebetween) across a length of a surface that is, for example 75 mm, or 100 mm, or across the length of the beam splitter.

Examples of beam splitter glasses that have a total thickness variation is less than 0.02 mm with surfaces that are parallel to one another within 30 of arc seconds or less are Gorilla® glass, Lotus™ XT glass, Lotus™ NXT glass, or EAGLE XG glass available from Corning Incorporated, of Corning N.Y. Using glass having such flatness and thickness accuracy leads to greatly improved image quality without ghost images because, in the event the image reflects off of both surfaces, they are so close together that they land on retina in virtually the same location. The beam splitter plate is preferably coated on one side with a partial reflective coating and coated on the other side with an anti-reflection (AR) coating. Peak efficiencies for the display system are obtained when the partial reflector closely approaches 50% reflectivity (meaning an average of 50% reflectance across the visible region of the spectrum), for example when the partial reflector achieves between about 40%-60%, more preferably between about 45-55% reflectance across the visible region of the spectrum, and when there is an anti-reflective coating on the other side. For example, an aluminum metal coating can be applied via evaporative coating techniques to achieve such partial reflectance.

In some embodiments, the anti-reflective coating exhibits less than 10%, more preferably less than 5%, even more preferably less than 2% and most preferable less than 1 or even less than 0.5% reflectivity (meaning an average of less than 0.5% reflectance across the visible region of the spectrum). For example, a dielectric layer or dielectric stack of layers, such as can be applied via evaporative coating techniques, can be utilized to achieve such antireflective properties. This will also block 50% of the light from the real-world object scene. As the reflection of the beam splitter is decreased, the display image gets dimmer and the outside scene gets brighter. Thus, varying these coating parameters can help to balance the light levels from the display and the outside scene.

Reflective Components

Reflective component Rc can be molded plastic or glass. According to some reflective component $Rc_L$, $Rc_R$ are situated in contact with one another. According to some embodiments reflective component $Rc_L$, Rc are formed together (e.g., molded) as one monolithic component. According to the embodiments described herein the reflective component $Rc_L$, Rc are formed or shaped to provide a space for a viewer's nose to fit at least partially therebetween. For example reflective component $Rc_L$, $Rc_R$ may be molded together as a monolithic structure with a notch or a chamfer so as to create a "nose insertion space" therebetween.

According to some embodiments the reflective and refractive surfaces of reflective components Rc are structured such that said optical axes of the two reflective surfaces 20 are parallel to each other within 1 minute of arc and spaced by each other by a distance between 50 mm and 80 mm (e.g., 60 mm-70 mm).

A reflective coating 20' can form reflective surface 20) of the reflective components Rc reflective component Rc. The reflective coating is a dichroic coating 20' according to an embodiment. Alternately, a metallic coating can be applied. As described above, reflective components Rc1 and $R_c2$ can be formed joined together as a single molded assembly.

Packaging Options

The apparatus of the present disclosure can be assembled as part of a head-mounted device, using conventional eyeglass-type frames, headband, or other mechanisms that mount the display against the head. The apparatus can alternately be coupled to a head covering, hat, or helmet, depending on the intended application.

Embodiments of the present disclosure can take advantage of the small component count, relaxed tolerances, reduced weight, and structural rigidity of the beam splitter plate 26 substrate to allow a number of improved packaging arrangements for display apparatus 30.

Figure 7B:
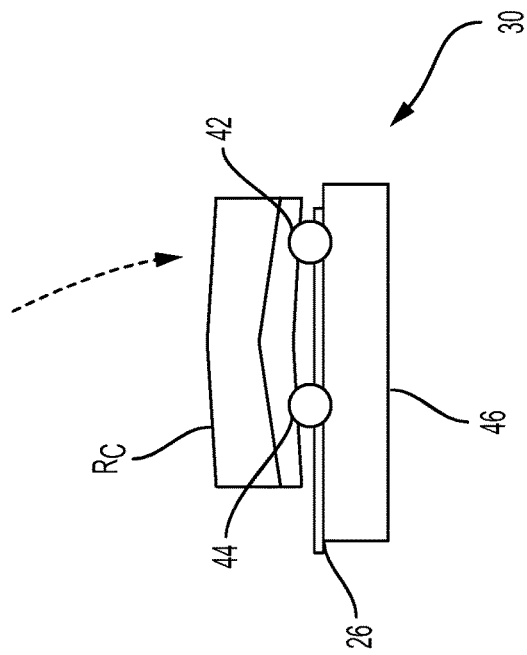
FIGS. 7A and 7B are side views of a foldable packaging arrangement for a display apparatus according to an embodiment of the present disclosure.
Figure 7A:
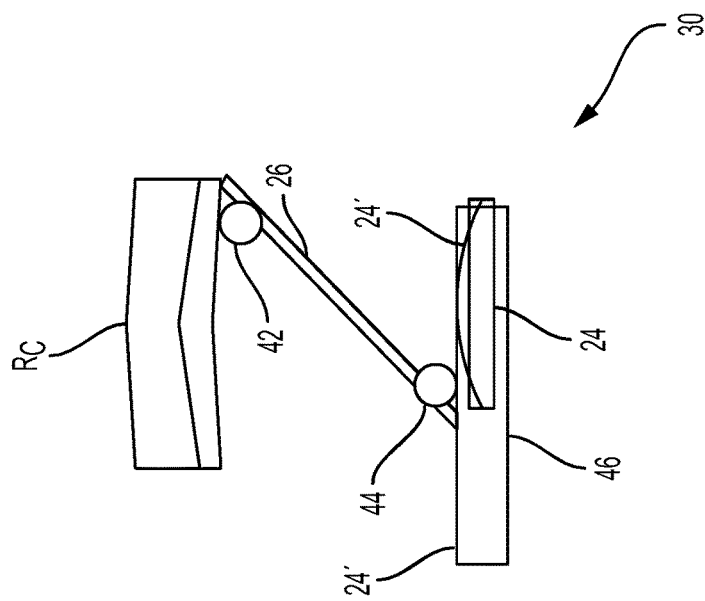

The side views of FIGS. 7A and 7B show a simplified diagram for a foldable version of display apparatus 30 according to an embodiment of the present disclosure. Beam splitter plate 26 is flexibly coupled reflective components RcL, RcL by a first hinge 42 or other type of flexible coupling, such as along an edge of beam splitter plate 26. A second hinge 44 couples beam splitter plate 26 to a housing or frame 46 that supports image generator 24, such as a housing for temporary insertion and easy removal of a smartphone device, for example. FIG. 7A shows display apparatus 30 in configuration for viewing. FIG. 7B shows display apparatus 30 folded for carrying or storage (with image generator 24 removed. It can be appreciated that numerous possible mechanical arrangements can be devised for providing a version of display apparatus 30 that is foldable with respect to the vertical direction, using only a small number of mechanical components.

Figure 8:
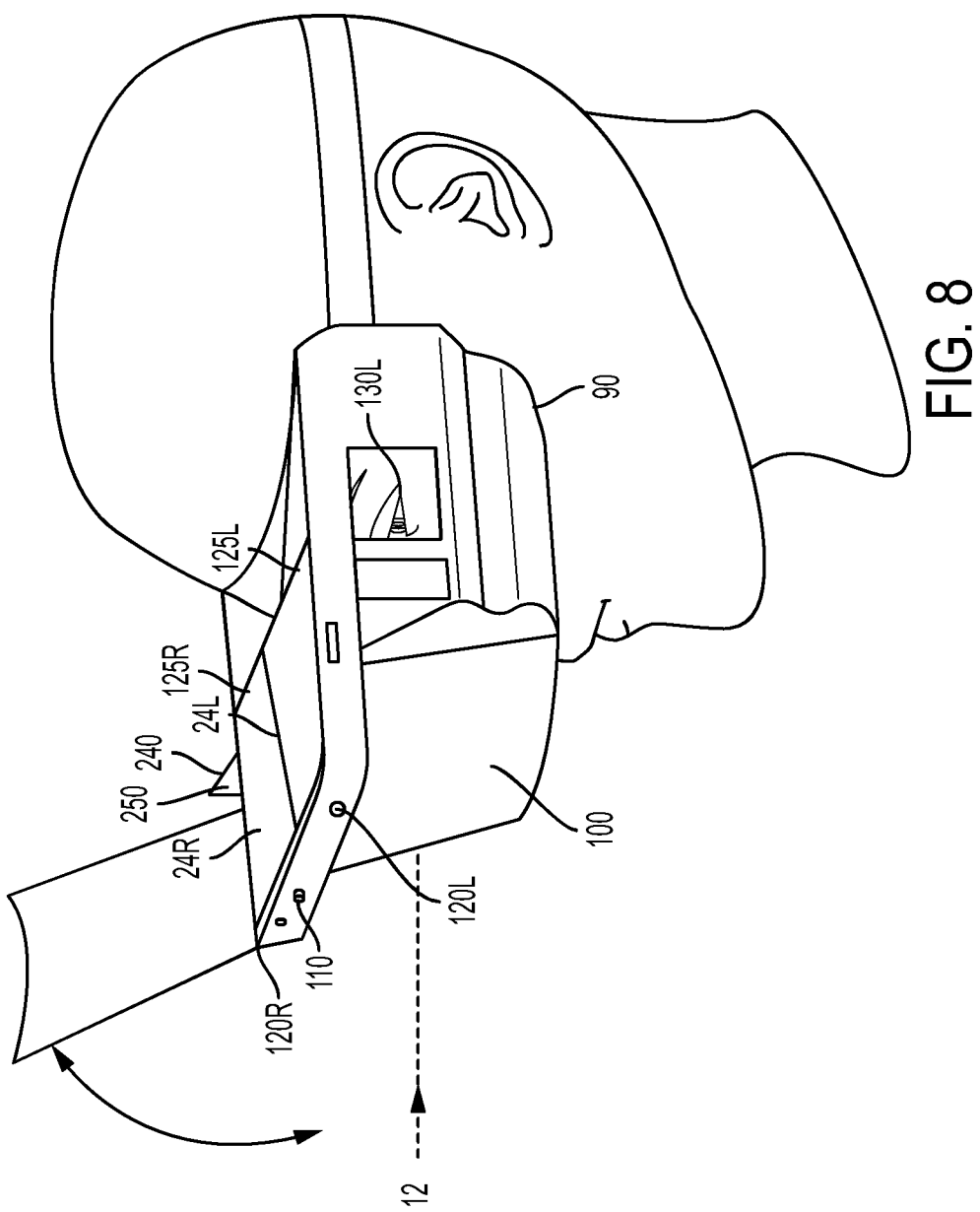
FIG. 8 illustrates an embodiment of the display apparatus in a mechanical housing with a protective shield and peripheral windows, optical component for folding the viewing direction of image generator that is situated over the camera and a visor for sun glare minimization.

FIG. 8 illustrates one embodiment of the display apparatus 30 that comprises a mechanical housing 90. In this embodiment two image generator 24 (e.g., two "smart" watches with surface 24', not shown) is mounted in a housing 90 above the eye level. Surfaces 24' are oriented so that they face optical components situated inside, within the housing 90. The light from a physical scene that the viewer is looking at is transmitted through the beam splitter 26 (situated inside the housing 90) along the line of site 12 (see FIG. 1A) to the viewer's eyes and is combined with the light from the image generator 24, to form an augmented reality (AR) image. The housing 90 also supports an outer protective shield 100 (also shown schematically in FIG. 5B). Outer protective shield 100 can be made from plastic such as polycarbonate to protect the optical components of the display apparatus 30 from dust and damage. Outer protective shield 100 may also comprise scratch resistant tempered glass, for example Gorilla® glass available from Corning Incorporated of Corning, N.Y. The protective shield can be coated with an anti-reflective coating or an absorbing coating that controls the amount of light from the reality scene that gets to the viewer's eyes. For example, in some embodiments the outer protective shield 100 may comprise photochromic material, or a polarizer. In this embodiment the light from a physical scene enters the display apparatus 30 through outer protective shield 100 and superimposed with light provided by the image generator 24.

Also shown in FIG. 8 is a power activator 110 (e.g., a spring plunger, or a button, or another component), which is at least partially situated within housing 90, and pushes against the power button on the image generator 24, when engaged by the user to turn on the image generator.

Also shown in FIG. 8 are windows 130L situated on sides of housing 90, so that the viewer/device user has a view of the periphery. There is a corresponding window 130R cut into the right side of the housing 90. The display device of FIG. 8 also utilizes an inner protective shield 105 (not shown FIG. 8). The inner protective shield 105 (See FIG. 5B) also protects the optical components from dust, etc., and in addition may serve as additional protection for viewer's eyes from UV light (e.g., if it has a UV coating thereon), or from other environmental damage. Both shields 100 and 105 may be made from polycarbonate. The inner protective shield 105 can be coated with an anti-reflective coating to reduce stray light and glare. Therefore, according to some embodiments the display device 30 includes a curved protective shield 100 made from polycarbonate that transmits the light from the physical scene before being combined by the beam splitter. According to some embodiments the display device 30 further includes a curved protective shield 105 made from polycarbonate that transmits the light from the physical scene after being combined by the beam splitter. According to some embodiments the curved protective shield 105 includes an anti-reflective coating on a side facing the viewer. According to some embodiments the outer protective shield 100 includes an anti-reflective coating on a side facing the viewer. According to some embodiments at least one of the protective shields 100, 105 includes an oleo phobic and/or an anti-fog coating (not shown).

The image generator(s) 24 can be aligned by rotating the image generator using set screws 120R and 120L as they apply force to spring plungers 125R and 125L (not shown) through the image generator 24. For example, component 120R is a set screw that applies force through the image generator 24 to a spring plunger 125R. The corresponding set screw 120L and spring plunger 125L are also used to rotate the image generator 24 about the principal axis A. According to some embodiment the display device 30 includes a component that adjust the rotation of the image generator about an axis parallel to the principal axis of the reflective surface.

According to some embodiment the display device 30 includes a means of adjusting the rotation of the image generator about an axis parallel to the principal axis of the reflective surface.

The display apparatus may comprise an optical component 250 that folds the viewing direction of an imaging system 240 associated with the image generator 24. For example, in FIG. 8 embodiment, the image generator 24 may be a cell phone or a "smart" watch with a curved display surface 24' and may include a camera 240 (e.g., the imaging system of a cell phone(s)). An optical component 250, such as a folding mirror or a prism is situated adjacent to the camera 240. The optical component 250 is structured to fold the viewing direction of a camera. Thus, the camera can "view" or "see" at least a portion of the view viewed by the viewer through the beam splitter. That is, the camera with the help of the optical component 250 can "look" in the same direction that the viewer is looking at. For example, in some embodiments, the optical component 250 comprises a reflective surface such that the field of view of the camera includes the line of sight of the viewer through the beam splitter. The reflective surface can be formed, for example, by a reflective coating. The display device may further incorporate at least one imaging system 240' (for example a camera in a cell phone that is structured and positioned to take ("selfie") pictures of the end user. Imaging system 240' (e.g., camera lenses) is adapted, or example in conjunction with optical folding optical components 250' (that may be similar to that of optical component 250 described above) to "look" through the beam splitter at the viewer's eyes, and thus track where the viewer is looking.

The display apparatus may also comprise at least one visor 300A, 300B, for blocking the sun (for sun glare minimization). In the embodiment, visor 300A is hinged and its position (angle) can be adjusted by the viewer, as needed. An alternative visor 300B is slideable in and out of position, as needed. According to some embodiments (not shown) side visors may also be deployed over the side windows (and peripheral windows 130L, 130R). Visors 300A, 300B, as well as the side visors may be opaque, or may comprise a polarizer or a comprise photochromic material, for minimizing sun glare.

According to some embodiments (not shown), the display apparatus comprises at least one of: a GPS sensor, at least one head tracking sensor, eye tracking sensors, accelerometer, or a camera situated between the two lenses that "looks" through the beam splitter at viewer's eyes.

It is noted that utilizing two small image generators 24R, 24L, advantageously reduces the size of the overall display apparatus. These image generators 24r, 24L may be situated either blow, or above the viewer's eyes. The display device may further incorporate one or two cameras 240' (as shown schematically in FIG. 8) that are adapted or structured for example, in conjunction with optical folding optical components 250' to "look" through the beam splitter at the viewer's eyes, and thus track where the viewer is looking. For example, an imaging system or cameras 240' may be situated near or adjacent to the image v generators 24R, 24L. Alternatively, one or more cameras 240' may be situated between the two lenses that "look" through the beam splitter at viewer's eyes. Cameras 240' may also be positioned elsewhere in the display device, for example adjacent to, or situated on the protective shields 100 or 105 such that they can track position of viewer's eyes (or eye pupils). These cameras 240' alone, or in conjunction with other optical components can track the eyes so that the position of the real scene looked at by the viewer is "known" to the display device, and virtual portion of the AR overlay can be placed in the proper location (for each eye) into the actual scene viewed by the viewer. As described above, this be accomplished, for example, through multiple cameras, using a lens/prism system, an/or a reflector to multiplex the image(s) into proper locations. Additionally, one can use software algorithms in conjunction with one or more eye tracking cameras (or user's line of site tracking camera(s) to create a proper overlay of virtual image on a real/actual scene that the viewer is looking at.

Accordingly, as described herein, some embodiments of the display system further comprise at least one of: a GPS sensor, at least one eye (or eye tracking) tracking sensor, an accelerometer, or a camera that looks through at either the viewer's eyes or the scene viewed by the viewer.

It should also be noted that, for embodiments in which augmented reality is not desirable and only an electronically generated image is desired, light from the real world object scene can alternately be blocked for one or both eyes, such as by a shield.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A display apparatus comprising:
   at least one image generator having a curved display surface that generates image-bearing light, the display surface having at least one radius of curvature $r1_d$;
   a reflective component spaced apart from the image generator, the reflective component having an incident reflective surface concave to the image and at least one radius of curvature $r1_r$, disposed to create a virtual image of said curved display surface;
   adjustment components structured to adjust a position of said display apparatus, the adjustment components including at least one screw engaging the image generator at one side and at least one spring plunger engaging the image generator at another side; and
   a beam splitter plate disposed in a linear arrangement with and between the image generator and the reflective component and having first and second surfaces that are oblique to a line of sight of a viewer,
   wherein the beam splitter plate traverses the line of sight creating a slanted window, and
   wherein the reflective component and the beam splitter plate define a viewer eye box for the image-bearing light along the line of sight of the viewer, wherein the curved display surface and the reflective surface are substantially concentric.

2. The display apparatus of claim 1, wherein the wherein the curved display surface and the reflective surface are concentric to within 5 mm.

3. The display apparatus of claim 1, wherein the curved display surface and the reflective surface are concentric to within 3 mm.

4. The display apparatus of claim 1, wherein the curved display surface and the reflective surface are concentric to within 1 mm.

5. The display apparatus of claim 1, wherein the curved display surface and the reflective surface are concentric.

6. The display apparatus of claim 1, wherein the display surface is cylindrical, and the incident reflective surface concave of the reflective component is spherical.

7. The display apparatus of claim 1, wherein the display surface is cylindrical, and the incident reflective surface concave of the reflective component is rotationally symmetric.

8. The display apparatus of claim 1, wherein the display surface is toroidal, and the incident reflective surface concave of the reflective component is rotationally symmetric.

9. The display apparatus of claim 1, wherein $2.1 \geq r1_r/r1_d > 1.5$.

10. The display apparatus of claim 1, wherein 120 mm $\geq r1_r \geq$ 60 mm.

11. The display apparatus of claim 10, wherein 60 mm $\geq r1_d \geq$ 30 mm.

12. The display apparatus of claim 10, wherein 100 mm $\geq r1_r \geq$ 50 mm.

13. The display apparatus of claim 12, wherein 50 mm $\geq r1_d \geq$ 45 mm.

14. The display apparatus of claim 1, wherein the first and second surfaces of the beam splitter plate are parallel to within 50 arc seconds.

15. The display apparatus of claim 14, wherein the first and second surfaces of the beam splitter plate are parallel to within 40 arc seconds.

16. The display apparatus of claim 14, wherein the first and second surfaces of the beam splitter plate are parallel to within 20 arc seconds.

17. The display apparatus of claim 14, wherein the beam splitter plate is made from fusion formed glass.

18. The display apparatus of claim 1, wherein the reflective component comprises a body with at least one curved surface and the reflective coating thereon, the body comprising material selected from the group consisting of: acrylic, styrene, polycarbonate, optical glass, or combinations thereof.

19. The display apparatus of claim 1, further comprising light from a viewable scene passing through the beam splitter along the line of sight of the viewer, said light from the viewable scene being presented to the viewer simultaneously with the image bearing light.

20. The display apparatus of claim 19, further comprising a curved protective shield that transmits the light from a physical scene after being combined by the beam splitter.

21. The display apparatus of claim 20, wherein the curved protective shield includes an anti-reflective coating on a side facing the viewer.

22. The display apparatus of claim 20, wherein the curved protective shield comprises an oleo-phobic and/or an anti-fog coating.

23. The display apparatus of claim 1, wherein the image generator comprises an LCD display.

24. The display apparatus of claim 1, wherein the image generator comprises an organic light-emitting diode (OLED) display.

25. The display apparatus of claim 1, wherein the image generator comprises a personal communications device.

26. The display apparatus of claim 25, wherein the personal communications device is a watch.

27. The display apparatus of claim 26, wherein the personal communications device is wrist wearable device.

28. The display apparatus of claim 27, wherein the beam splitter plate weighs 3-15 grams.

29. The display apparatus of claim 1, wherein the beam splitter plate weighs less than 26 grams and provides a horizontal full field of view that exceeds 40 degrees.

30. The display apparatus of claim 1, wherein the reflective component is molded from plastic and has a reflective coating thereon.

31. The display apparatus of claim 1, wherein light from a physical scene is transmitted through the beam splitter plate to viewer's eyes and combined with the light provided by the image generator.

32. The display apparatus of claim 31, further comprising a curved protective shield made from polycarbonate that transmits the light from a physical scene before being combined by the beam splitter plate.

33. The display apparatus of claim 1, wherein the beam splitter plate is a polarization beam splitter and further comprising a quarter wave plate disposed between the beam splitter plate and the reflective component.

34. The display apparatus of claim 1, which further includes adjustment components structured to adjust rotation of the image generator about an axis.

35. The display apparatus of claim 1, wherein the adjustment components comprise a plurality of screws engaging the image generator at one side and a plurality of spring plungers engaging the image generator at another side.

36. The display apparatus of claim 1, wherein the display apparatus is wearable by the viewer.

37. An Augmented Reality Display comprising: a left display apparatus for a left viewer eye and a right display apparatus for a right viewer eye, wherein each left and right display apparatus comprises the display apparatus of claim 1.

38. A display apparatus comprising:
   at least one image generator having a convex curved display surface that generates image-bearing light;
   a reflective component spaced apart from the image generator and disposed to create a virtual image of said curved display surface;
   a beam splitter plate disposed between the image generator and the reflective component; and
   adjustment components structured to adjust position of said display apparatus, the adjustment components comprising at least one screw engaging the image generator at one side and at least one spring plunger engaging the image generator at another side,
   wherein the reflective component and the beam splitter plate define a viewer eye box for the image-bearing light along a line of sight of a viewer.

* * * * *